US008978781B2

(12) United States Patent
Burdick et al.

(10) Patent No.: US 8,978,781 B2
(45) Date of Patent: Mar. 17, 2015

(54) DUST SHROUD FOR POWER TOOLS

(75) Inventors: Mitchell Wayne Burdick, Des Plaines, IL (US); Stanford Jensen, Price, UT (US); Spencer Loveless, Price, UT (US)

(73) Assignee: Robert Bosch GmbH, Stuttgart (DE)

( * ) Notice: Subject to any disclaimer, the term of this patent is extended or adjusted under 35 U.S.C. 154(b) by 769 days.

(21) Appl. No.: 13/314,062

(22) Filed: Dec. 7, 2011

(65) Prior Publication Data

US 2012/0142263 A1 Jun. 7, 2012

Related U.S. Application Data (60) Provisional application No. 61/420,697, filed on Dec. 7, 2010.

(51) Int. Cl.
*B25D 17/14* (2006.01)
*B23Q 11/00* (2006.01)
*B25D 17/20* (2006.01)

(52) U.S. Cl.
CPC ............ *B23Q 11/0046* (2013.01); *B25D 17/20* (2013.01); *B25D 2217/0065* (2013.01)
USPC .............................. 173/198; 173/78; 173/211

(58) Field of Classification Search
CPC ........ B23B 45/00; B23B 45/14; B23Q 11/00; B28D 7/00; B28D 7/02; B28D 7/04
USPC .................. 173/78, 130, 106, 217, 168, 198; 406/113, 152; 15/104.03, 104.05, 15/104.16; 138/108–110, 119, 120, 138/DIG. 11; 408/67
See application file for complete search history.

(56) References Cited

U.S. PATENT DOCUMENTS

| | | | | |
|---|---|---|---|---|
| 2,041,690 A | * | 5/1936 | Baumeister et al. | 175/135 |
| 2,250,670 A | * | 7/1941 | Joy | 175/173 |
| 2,250,671 A | * | 7/1941 | Joy | 175/173 |
| 2,792,199 A | * | 5/1957 | Becker et al. | 175/211 |
| 3,339,435 A | * | 9/1967 | Heitz | 408/67 |
| 3,540,322 A | * | 11/1970 | Swanson | 408/112 |
| 3,583,821 A | * | 6/1971 | Shaub et al. | 408/72 R |
| 4,921,375 A | * | 5/1990 | Famulari | 408/67 |
| 4,955,984 A | * | 9/1990 | Cuevas | 408/67 |
| 5,034,041 A | * | 7/1991 | Austin | 55/385.1 |
| 5,061,123 A | * | 10/1991 | Broussard | 408/67 |
| 5,137,096 A | | 8/1992 | Druesdow | |

(Continued)

FOREIGN PATENT DOCUMENTS

| | | |
|---|---|---|
| EP | 1092494 A1 | 4/2001 |
| EP | 1245330 A2 | 10/2002 |

OTHER PUBLICATIONS

International Search Report and Written Opinion in corresponding PCT application (i.e., PCT/US2011/063825), completed Feb. 16, 2012. (9 pages).

*Primary Examiner* — Stephen F Gerrity
*Assistant Examiner* — Eyamindae Jallow
(74) *Attorney, Agent, or Firm* — Maginot Moore & Beck LLP (57) ABSTRACT

A dust shroud assembly for a power tool includes a shroud portion, a barrel, and a helical spring. The barrel includes an upper portion slidably received within a first end portion of the shroud portion. The barrel defines a helical channel. The helical spring is at least partially rotatably engaged with the helical channel and rotationally fixed with respect to the shroud portion. The helical spring is configured to bias the barrel outwardly from the first end portion.

17 Claims, 8 Drawing Sheets

(56) References Cited

U.S. PATENT DOCUMENTS

| | | | |
|---|---|---|---|
| 5,160,230 A * | 11/1992 | Cuevas | 408/67 |
| 5,199,501 A * | 4/1993 | Kluber et al. | 173/75 |
| 5,292,210 A * | 3/1994 | Nowick | 408/67 |
| 5,419,663 A * | 5/1995 | Psomas | 408/67 |
| 5,464,286 A * | 11/1995 | Stevens et al. | 383/75 |
| 5,653,561 A * | 8/1997 | May | 408/67 |
| 5,688,082 A * | 11/1997 | Richardson | 408/67 |
| 5,746,551 A * | 5/1998 | Skaggs | 408/1 R |
| 5,765,654 A * | 6/1998 | Burger | 175/211 |
| 6,079,078 A * | 6/2000 | Byington | 15/339 |
| 6,146,066 A * | 11/2000 | Yelton | 409/134 |
| 6,227,307 B1 * | 5/2001 | Lee | 173/78 |
| 6,247,879 B1 * | 6/2001 | Costa | 408/112 |
| 6,830,113 B2 | 12/2004 | Moore et al. | |
| 6,851,898 B2 * | 2/2005 | Ege et al. | 408/67 |
| D590,227 S * | 4/2009 | Yun | D8/70 |
| 7,549,826 B2 * | 6/2009 | Videtto | 408/1 R |
| 7,740,086 B2 * | 6/2010 | Bleicher et al. | 173/198 |
| 7,797,794 B2 * | 9/2010 | Bleicher et al. | 15/415.1 |
| 8,409,310 B2 * | 4/2013 | Despineux et al. | 55/385.1 |
| 8,443,914 B2 * | 5/2013 | Bito et al. | 173/198 |
| 2002/0141836 A1 * | 10/2002 | Ege et al. | 408/67 |
| 2005/0268427 A1 | 12/2005 | Britz | |
| 2010/0155095 A1 * | 6/2010 | Furusawa et al. | 173/198 |
| 2012/0291904 A1 * | 11/2012 | Eckardt et al. | 138/109 |
| 2012/0298391 A1 * | 11/2012 | Kakiuchi et al. | 173/77 |
| 2013/0056105 A1 * | 3/2013 | Graham et al. | 138/120 |
| 2013/0284302 A1 * | 10/2013 | Castro | 138/109 |

* cited by examiner

FIG. 12 even though there are many benefits to using a dust shroud 
DUST SHROUD FOR POWER TOOLS This application claims the benefit of U.S. Provisional Application Ser. No. 61/420,697, filed Dec. 7, 2010, the disclosure of which is incorporated herein by reference in its entirety.

FIELD

This patent relates generally to dust shrouds and in particular to dust shrouds for use with power tools, such as jackhammers, chipping hammers, drills, and the like.

BACKGROUND

Dust shrouds and dust collectors have become more important at least in part due to an increased awareness of the hazards of certain types of dust and a demand for effective dust collection. Dust shrouds are used with many types of power tools including such tools as jackhammers, chipping hammers, rotary hammers, and drills. Jackhammers and chipping hammers, for example, are commonly used for breaking materials such as concrete and other masonry materials. Rotary hammers and drills are commonly used for boring holes into materials including concrete and other masonry materials. Without an adequate dust shroud, these types of power tools scatter dust over a wide area.

Effective dust collection within a workplace or work area is desirable for several reasons. It is desirable to contain dust and debris to keep the workplace clean and to minimize cleanup time. Additionally, users desire to contain dust and debris to prevent wear and damage to the dust generating power tool. Furthermore, inhalation of some types of debris, such as concrete dust, poses a health risk to the power tool operator and others in the vicinity. For these reasons and others, it is desirable to collect the dust generated by power tools.

One difficulty in effectively collecting the dust generated by power tools is that each power tool typically requires a differently sized dust shroud. For example, when considering a plurality of different jackhammers, each jackhammer may have a differently sized neck portion to which the dust shroud is mounted. Accordingly, each jackhammer may require a different dust shroud. Additionally, the typical jackhammer is usable with chisels and bits of various widths and lengths. Therefore, the dust shroud for a particular jackhammer should be sized and shaped to accommodate the chisel or chisels used most frequently.

Another difficulty in effectively collecting the dust generated by power tools is that some dust shrouds may interfere with the use of the power tool. For example, when a jackhammer is used to break through a thick section of concrete, the chisel is often plunged deeply into the material. Some dust shrouds may abut the surface of the concrete and prevent the chisel from being plunged to a sufficient depth within the material. Accordingly, it would be desirable for the dust shroud to maintain effective dust collection throughout the working range of the chisel or bit.

Even though there are many benefits to using a dust shroud for a power tool, many retail stores do not wish to stock many different models of dust shrouds. Similarly, it is undesirable for a manufacturer to make many different models of dust shrouds, because the tooling and production costs quickly become cost prohibitive. Also, individual consumers typically do not wish to special order a dust shroud and then wait for the shroud to arrive in the mail.

Therefore, a need exists for an improved dust shroud for jackhammers, chipping hammers, rotary hammers, drills and other similar types of power tools.

SUMMARY

According to one embodiment of the disclosure a dust shroud assembly for a power tool includes a shroud portion, a barrel, and a helical spring. The barrel includes an upper portion slidably received within a first end portion of the shroud portion. The barrel defines a helical channel. The helical spring is at least partially rotatably engaged with the helical channel and rotationally fixed with respect to the shroud portion. The helical spring is configured to bias the barrel outwardly from the first end portion.

According to another embodiment of the disclosure a dust shroud assembly for a power tool includes a shroud portion, a barrel, and a helical spring. The shroud portion includes an upper end portion and a downward end portion. The barrel is axially movable with respect to the shroud portion and defines a helical channel. The helical spring is at least partially rotatably engaged with the helical channel and rotationally fixed with respect to the shroud portion. The helical spring is configured to downwardly bias the barrel.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

For the purpose of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

Figure 1:
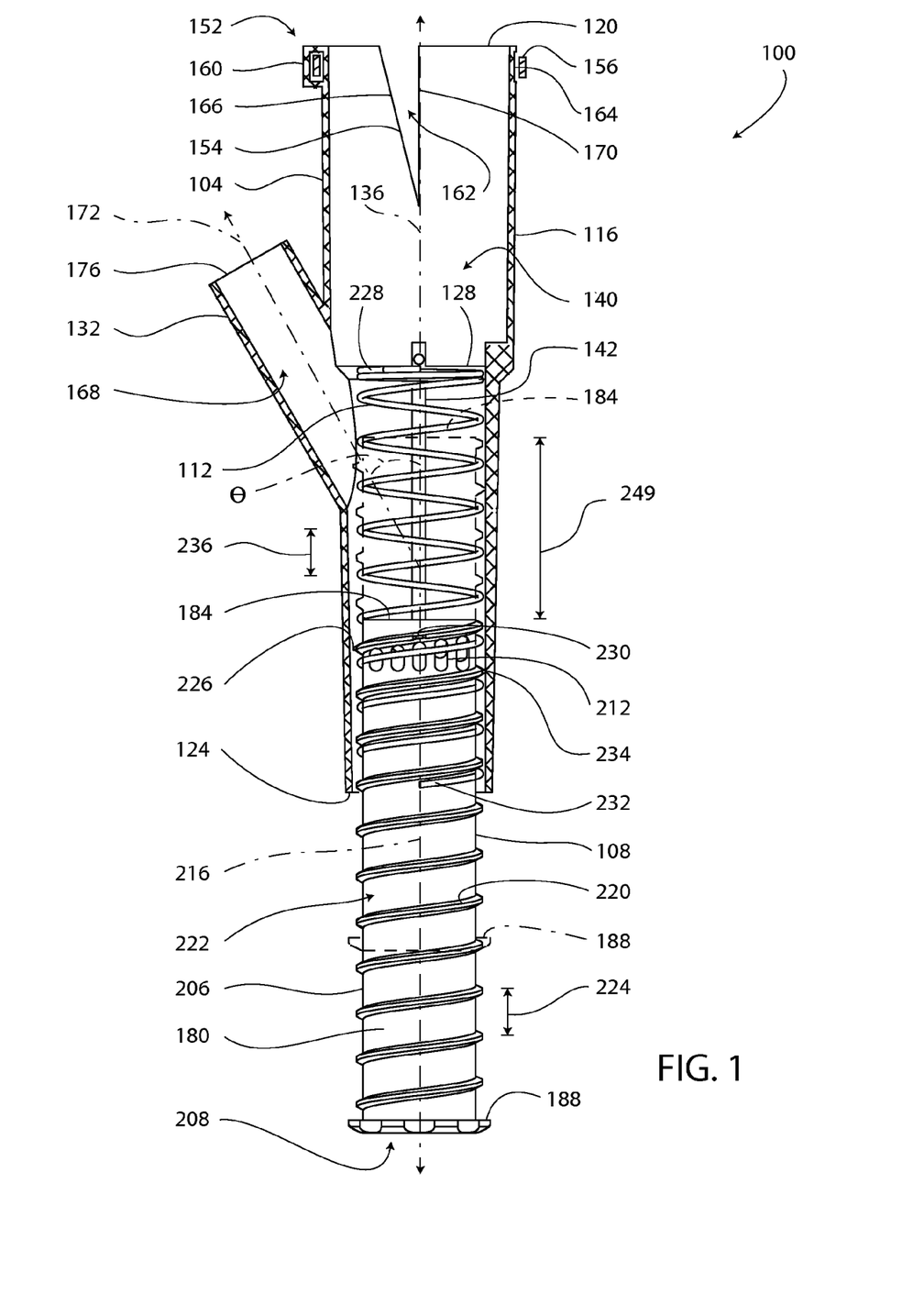
FIG. 1 is a side elevational view of a dust shroud assembly as disclosed herein, a shroud portion of the dust shroud assembly is shown in cross section and a barrel of the dust shroud assembly is shown in a relaxed position.
Figure 2:
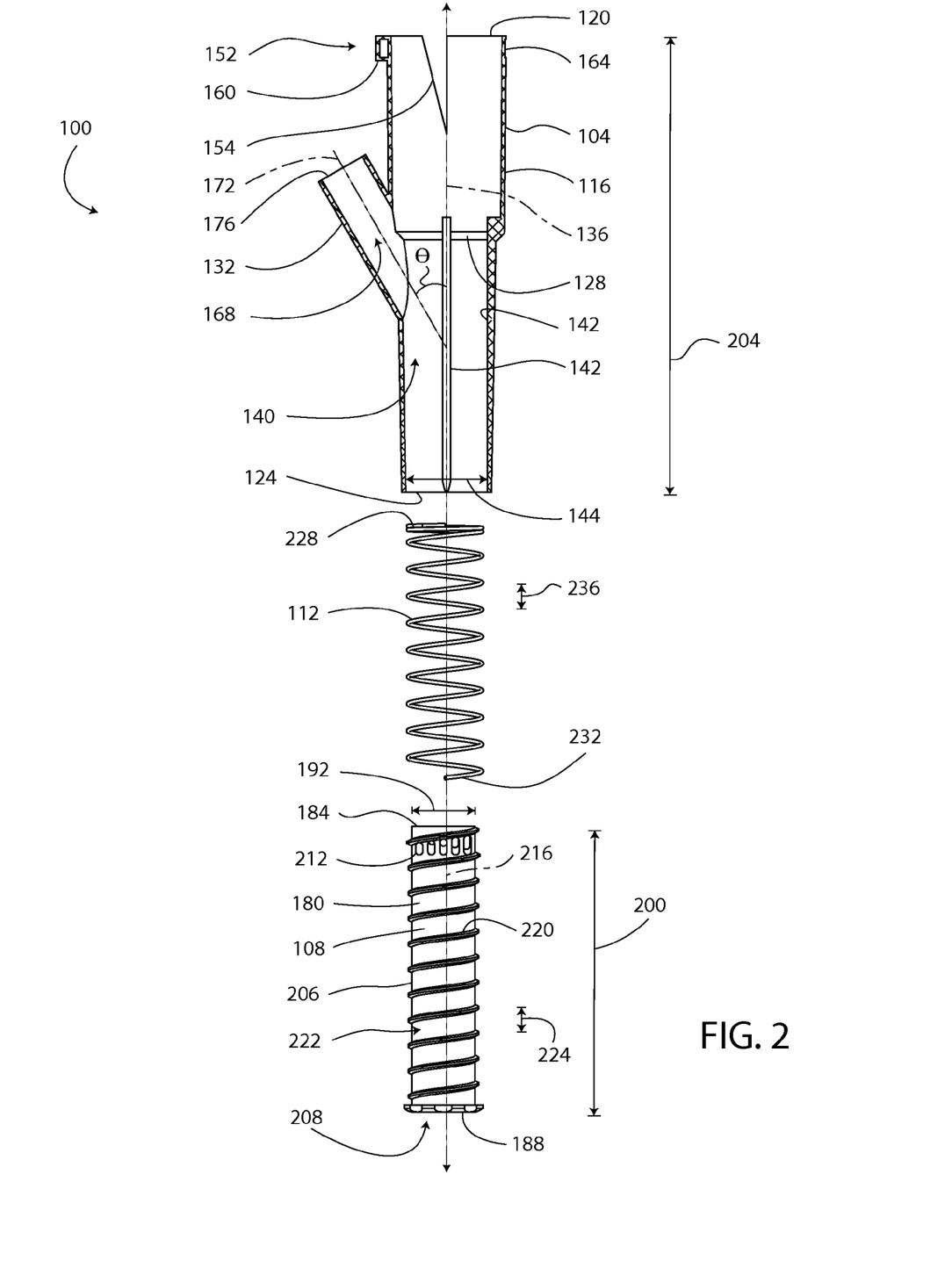
FIG. 2 is an exploded side elevational view of the dust shroud assembly of FIG. 1, with the shroud portion shown in cross section.

FIGS. 1 and 2 depict a dust shroud assembly 100 including a shroud portion 104, a barrel 108, and a helical spring 112. The shroud portion 104 includes a body 116, a spring support 128, and a vacuum port 132. The body 116 defines a substantially cylindrical upper end portion 120 and a substantially cylindrical downward end portion 124. A longitudinal axis 136 extends through body 116.

As shown in FIG. 2, the body 116 also defines a bore 140 and at least one internal ridge 142. The bore 140 extends between the upper end portion 120 and the downward end portion 124.

The internal ridge 142 (two of the ridges 142 are shown in FIG. 2) spans the shroud portion 104 from the spring support 128 to the downward end portion 124. The ridge 142 extends from the body 116 toward the longitudinal axis 136. The side of the ridge 142 that faces the longitudinal axis 136 is parallel to the longitudinal axis. The ridge 142 stabilizes the barrel 108 and the helical spring 112 as the barrel and the helical spring move relative to the shroud portion 104. In some embodiments, the shroud portion 104 includes three (3) of the ridges 142.

The upper end portion 120 defines a connection structure 152 and a cutout structure 154. The connection structure 152 includes a loop 160 and defines a groove 164 around the upper end portion 120. The connection structure 152 receives a circular clamp member 156 (FIG. 1) to connect the dust shroud assembly 100 to a neck 266, 278 of a power tool 268, 270 (See FIGS. 6 and 7).

With reference to FIG. 1, the cutout structure 154 defines a void 162 in the upper end portion 120 that extends between a first part 166 of the upper end portion 120 and a second part 170 of the upper end portion.

The downward end portion 124 of the shroud portion 104 is positioned on an end of the body 116 opposite to the upper end portion 120. The downward end portion 124 defines a diameter 144 (FIG. 2).

As shown in FIG. 2, the spring support 128 is positioned within the bore 140. In the illustrated embodiment, the spring support 128 is a substantially circular ridge that extends from the body 116 toward the longitudinal axis 136. In other embodiments of the shroud portion 104, the spring support 128 is provided as a groove, a ridge, a projection, or any other feature that is suitable for engaging the helical spring 112.

The vacuum port 132 is a substantially cylindrical element that extends from the body 116 of the shroud portion 104. The vacuum port 132 defines a bore 168 that is in fluid communication with the bore 140 defined by the body 116. The vacuum port 132 defines a longitudinal axis 172. The longitudinal axis 172 is angled with respect to the longitudinal axis 136 by the angle θ. In the illustrated embodiment, the angle θ is approximately thirty degrees (30°). A terminal end 176 of the vacuum port 132 is shown as open to atmosphere, but is typically connected to a vacuum supply line of a dust collection system (not shown).

In at least one embodiment, the shroud portion 104 is formed from an injection molded thermoplastic such that at least a portion of the shroud portion is substantially rigid in structure. The upper end portion 120 of the shroud portion 104, however, is flexible and resilient to enable the upper end portion to conform to a power tool 268, 270. In other embodiments, the shroud portion 104 is formed from other materials as desired by those of ordinary skill in the art.

With continuing reference to FIGS. 1 and 2, the barrel 108 includes a substantially cylindrical body 180 having an upper end portion 184 and a lower end portion 188. The body 180 defines an outer surface 206, a bore 208, and a longitudinal axis 216. The bore 208 extends from the upper end portion 184 to the lower end portion 188. The bore 208 is a substantially cylindrical void. The body 180 defines a diameter 192 (FIG. 2) that is less than the diameter 144; accordingly, at least a portion of the barrel 108 is slidably received within the shroud portion 104. When the barrel 108 is slidably received within the shroud portion 104, the longitudinal axis 216 is substantially coaxial with the longitudinal axis 136. In the embodiment shown in FIGS. 1 and 2, a length 200 (FIG. 2) of the barrel 108 is less than a length 204 (FIG. 2) of the shroud portion 104, such that the barrel is substantially completely receivable within the shroud portion. In other embodiments of the dust shroud assembly 100, the ratio of the length 200 to the length 204 may be greater than or less than one (1).

The barrel 108 further includes a helical ridge 220, which defines a helical channel 222. The helical ridge 220 extends outwardly from the outer surface 206 of the body 108. The helical ridge 220 wraps around the outer surface 206 numerous times, beginning at or near the lower end portion 188 and ending at or near the upper end portion 184. The helical ridge 220, in the illustrated embodiment, has a substantially constant pitch 224, which refers to an axial distance between adjacent revolutions of the helical ridge. In other embodiments, the pitch 224 varies along the longitudinal axis 216. Additionally, in other embodiments of the barrel 108, the helical ridge 220 is formed on an inner side of the barrel within the bore 208.

The helical channel 222 is defined between revolutions of the helical ridge 220. The helical channel 222 begins at or near the lower end portion 188, wraps around the body 180 numerous times, and terminates at or near the upper end portion 184.

With reference to FIG. 1, a first spacer 226, a second spacer 230, a third spacer 234, and a fourth spacer (not shown, opposite to the second spacer) extend outwardly from the helical ridge 220. The spacers 226, 230, 234 can contact the body 116 within the bore 140 to stabilize the lateral position of the barrel 108 within the shroud portion 104 during usage of the dust shroud assembly 100.

The barrel 108 is formed from an injection molded thermoplastic, which is substantially rigid in structure. In other embodiments, the barrel 108 is formed from other materials as desired by those of ordinary skill in the art, such as aluminum.

Referring still to FIGS. 1 and 2, the helical spring 112 includes a first end portion 228 and a second end portion 232. The first end portion 228 is supported by the spring support 128, such that the helical spring 112 is rotationally fixed with respect to the shroud portion 104. The second end portion 232 is not fixedly attached to the shroud portion 104. Each portion of the helical spring 112 that is not fixedly attached to the shroud portion 104 is movable relative to the shroud portion.

The helical spring 112 is at least partially rotatably engaged with the helical channel 222 of the barrel 108. In a relaxed state, as shown in FIGS. 1 and 2, the helical spring 112 defines a pitch 236, which refers to an axial distance between adjacent coils of the helical spring. In the relaxed state, the pitch 236 is substantially equal to the pitch 224. Alternatively, the pitch 236 is different than the pitch 224 to form an interference fit between the helical spring 112 and the helical ridge 220, which reduces unintended/unwanted rotation of the barrel 108 relative to the helical spring.

Engagement of the helical spring 112 with the helical ridge 220 enables two modes of movement of the barrel 108. In the first mode, the helical spring 112 remains substantially stationary and rotation of the barrel 108 with respect to the helical spring 112 causes the barrel to move axially (i.e. in a direction parallel to the longitudinal axis 136) with respect to the shroud portion 104. In particular, when the barrel 108 is rotated in a clockwise direction, as viewed from below in FIG. 1, the helical spring 112 rotatably receives a greater portion of the helical channel 222 and the upper end portion 184 is moved closer to the upper end portion 120. This movement may also be described as threading the barrel 108 onto the helical spring 112. Whereas, when the barrel 108 is rotated in a counterclockwise direction, as viewed from below in FIG. 1, the helical spring 112 rotatably receives a lesser portion of the helical channel 222 and the upper end portion 184 is moved away from the upper end portion 120. This movement may also be described as threading the barrel 108 off the helical spring 112.

The second mode of movement of the barrel 108 also enables the barrel to move axially relative to the shroud portion 104. In particular, the barrel 108 is movable between a relaxed position (shown in solid lines in FIG. 1) and a retracted position (shown in shadow in FIG. 1) without rotating relative to the shroud portion 104. When the barrel 108 is moved toward the retracted position, the barrel compresses a portion of the helical spring 112 as the upper end portion 184 moves toward the upper end portion 120 against the biasing force of the helical spring. It is the portion of the helical spring 112 that has not received the helical channel 222, which compresses to enable the axial movement of the barrel 108. The barrel 108 moves a compression distance 249 (FIG. 1) along the longitudinal axis 216 when moving from the relaxed position to the retracted position. When the barrel 108 is in the retracted position, the helical spring 112 downwardly biases the barrel toward the relaxed position, such that the barrel is biased outwardly form the downward end portion 124.

With reference to FIG. 1, when the barrel 108 is in the retracted position at least a portion of barrel is positioned above the vacuum port 132. To enable additional airflow between the bore 208 and the vacuum port 132 when the barrel 108 is in the retracted position, the barrel 108 includes at least one vent passage 212. The vent passages 212 are openings in the body 180 positioned near the upper end portion 184. The vent passages 212 fluidly couple the bore 208 to the bore 168.

Figure 3:
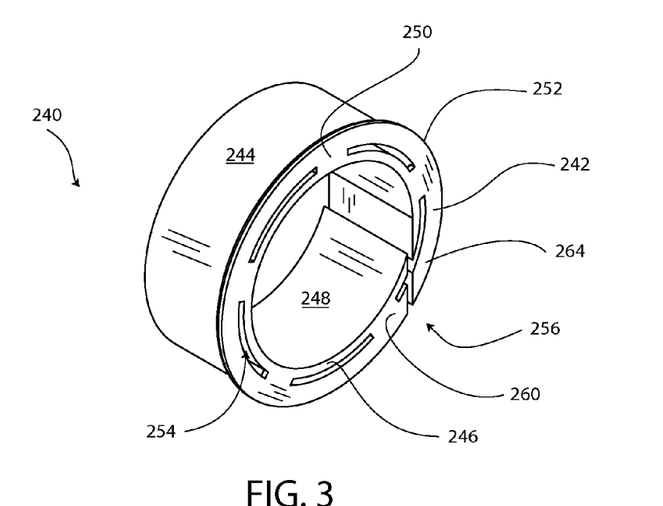
FIG. 3 is a perspective view of a mounting adapter for use with the dust shroud assembly of FIG. 1.
Figure 4:
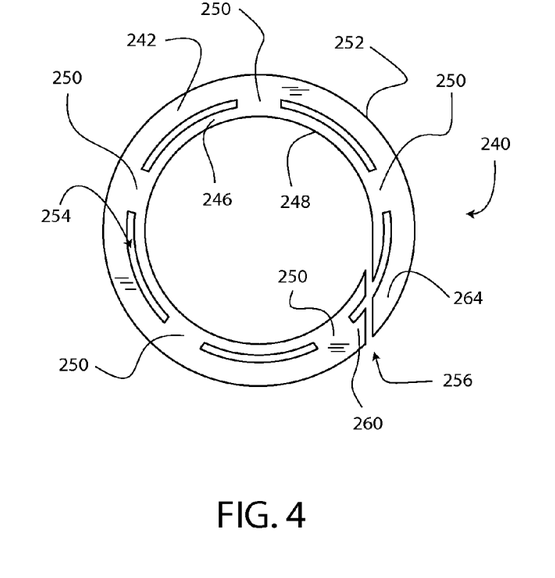
FIG. 4 is a top plan view of the mounting adapter of FIG. 3.
Figure 5:
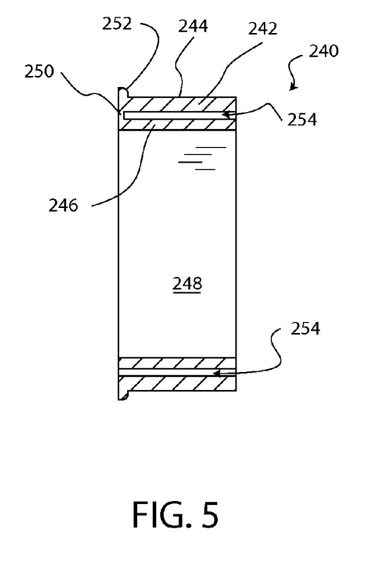
FIG. 5 is a side cross sectional view of the mounting adapter of FIG. 3.
Figure 6:
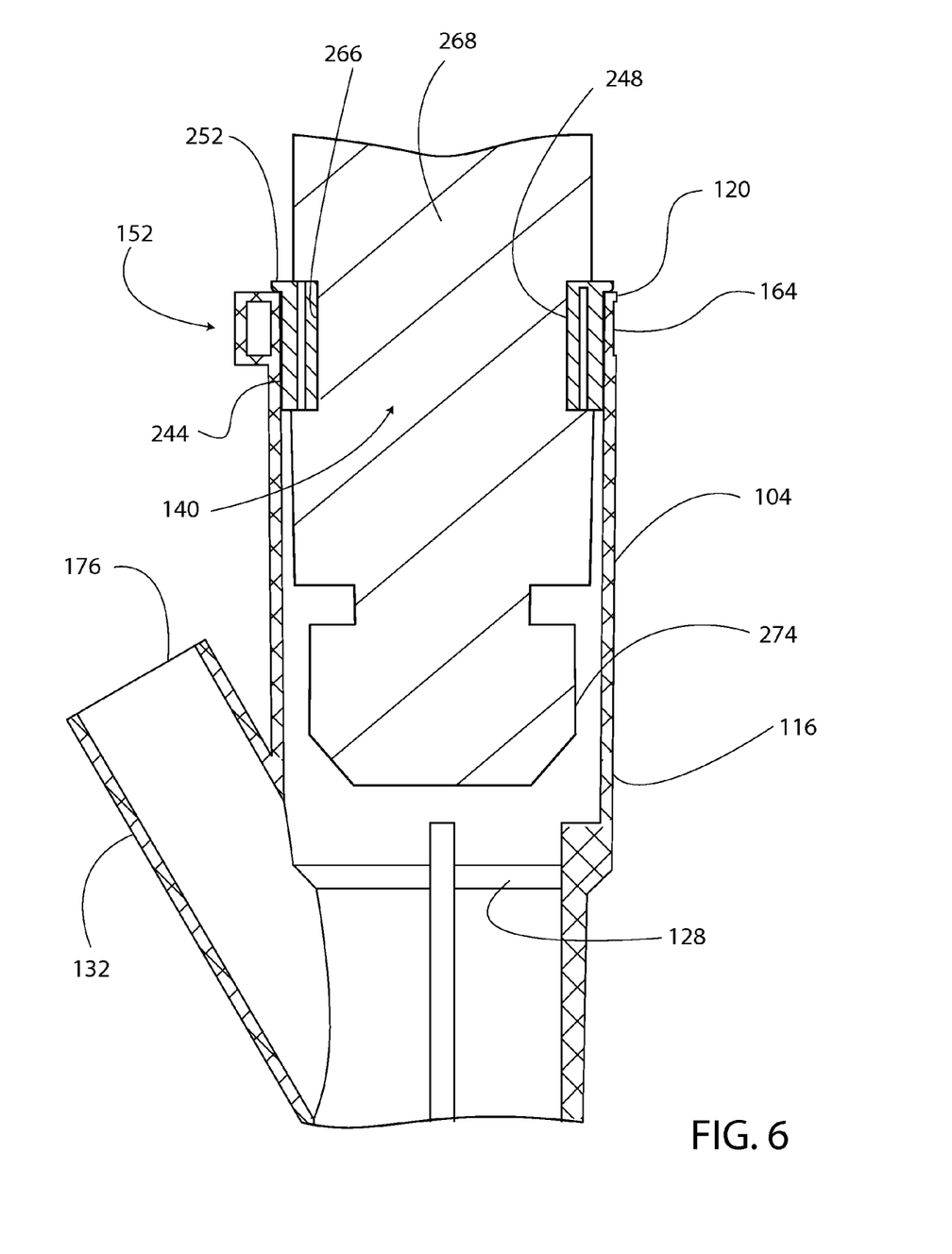
FIG. 6 is a side cross sectional view of a portion of the dust shroud assembly of FIG. 1, showing the mounting adapter and a portion of a first power tool positioned within the shroud portion.

As shown in FIGS. 3 to 5, the dust shroud assembly 100 further includes a mounting adapter 240, which is used when attaching the dust shroud assembly to some power tools, such as the power tool 268 (See FIG. 6). The power tool 268 is described briefly below followed by a description of the mounting adapter 240.

With reference to FIG. 6, the power tool 268 represents a combination rotary/chipping hammer; however, as used herein, the term "power tool" includes all types of jackhammers, demolition hammers, chipping hammers, rotary hammers, drills, and the like. The power tool 268 includes a chuck 274 and a hammer tube referred to herein as a neck 266, among other components that are not shown. The chuck 274 connects a chisel or bit (not shown in FIG. 6, see chisel 280 in FIG. 7) to the power tool 268. The terms chisel and bit are used interchangeably herein. The power tool 268 is typically pneumatically powered; however, some embodiments of the power tool are electrically powered.

With reference again to FIGS. 3 to 5, the mounting adapter 240 includes an outer cylinder 242 spaced apart from a concentric inner cylinder 246. A bore 254 is defined between the outer cylinder 242 and the inner cylinder 246. Five flexible support members 250 extend between the outer cylinder 242 and the inner cylinder 246 to position the outer cylinder with respect to the inner cylinder. The mounting adapter 240 is substantially cylindrical and is formed from injection molded thermoplastic, such that the mounting adapter is flexible and resilient. Accordingly, at least a portion of the outer cylinder 242 is movable with respect to the inner cylinder 246.

The outer cylinder 242 defines a first connection portion 244 and a ridge 252. The first connection portion 244 is defined by an exterior surface of the outer cylinder and is positioned against shroud portion 104 from within the bore 140 when the mounting adapter 240 is inserted into the upper end portion 120.

The ridge 252 extends outwardly from the exterior surface of the outer cylinder 242. When the mounting adapter 240 is inserted into the upper end portion 120, the ridge 252 is positioned against the shroud portion 104 to prevent further insertion of the mounting adapter 240 into the bore 140 (See FIG. 6).

The inner cylinder 246 defines a second connection portion 248. The second connection portion 248 is positioned against the neck 266 when the dust shroud assembly 100 is connected to the power tool 268. The connection portion 248 is shown as having a substantially uniform profile to engage the substantially uniform neck 266; however, the connection portion 248 may have a profile of any shape as is appropriate to engage the particular neck to which the dust shroud assembly 100 is connected.

As shown in FIGS. 3 and 4, a gap 256 separates a first end portion 260 of the mounting adapter 240 from a second end portion 264 of the mounting adapter. The gap 256 enables movement of the first end portion 260 relative to the second end portion 264. This movement enables the mounting adapter 240 to conform to the diameter of the neck 266 of the power tool 268.

Figure 7:
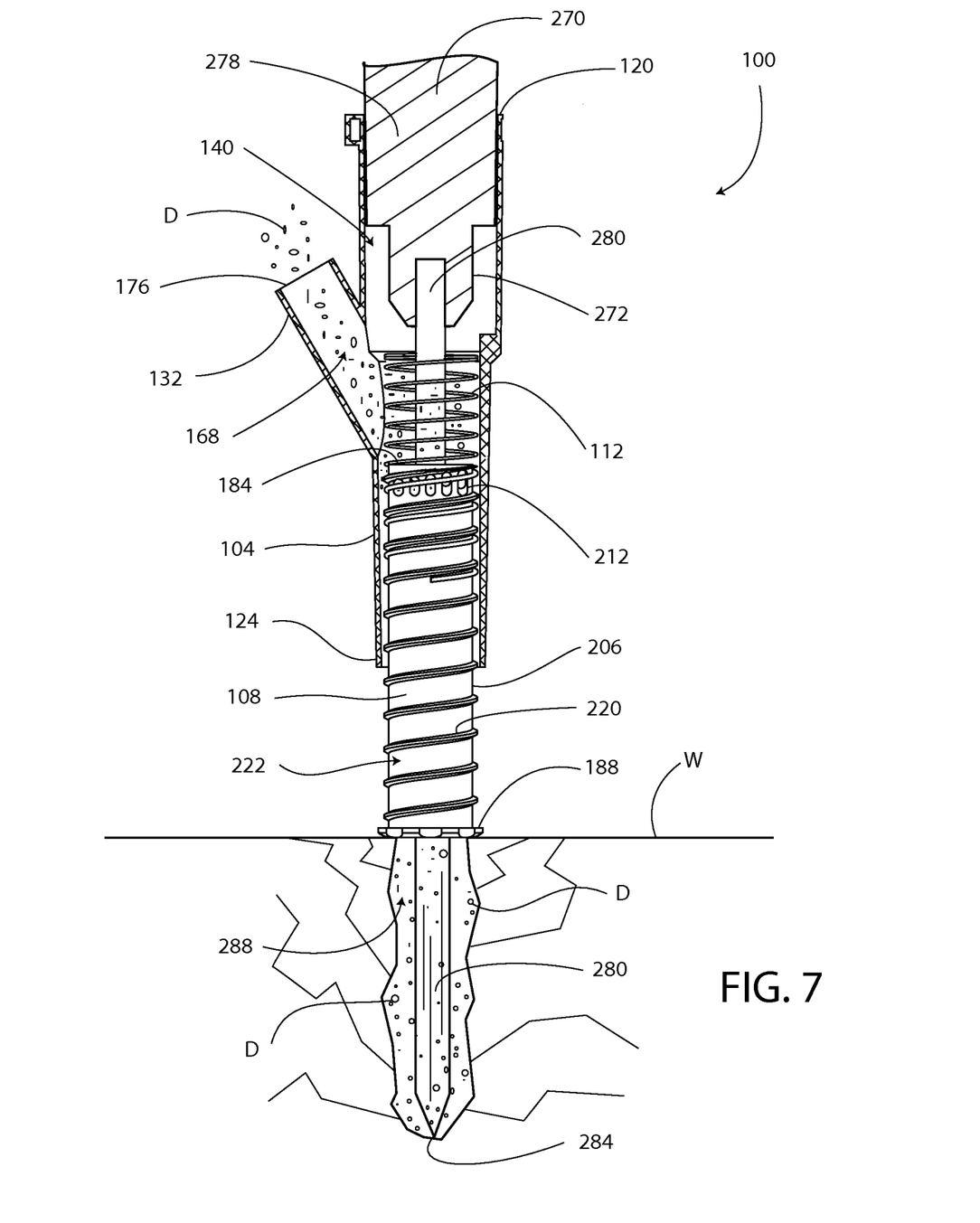
FIG. 7 is a side elevational view of the dust shroud assembly and a portion of a second power tool, the shroud portion is shown in cross section and the barrel is shown in a retracted position, a chisel of the power tool is shown plunged into a workpiece.

With reference to FIG. 7, the dust shroud assembly 100 is shown connected to another power tool 270. The power tool 270 includes a chuck 272 and a neck 278, among other components that are not shown. The chuck 272 connects a chisel 280 or bit to the power tool 270. When the power tool 270 is activated in a drilling mode, the chuck 272 and the chisel 280 rotate relative to the neck 278. Whereas, when the power tool 270 is activated in a chipping mode, the chuck 272 remains stationary relative to the neck 278 and the chisel 280 moves longitudinally relative to the neck 278.

The power tool 270 moves the chisel 280 longitudinally by delivering hammer strikes to the chisel 280 in a method known to those of ordinary skill in the art. When the chisel 280 is placed in contact with a workpiece W, such as concrete, and the power tool 270 is activated, the chisel 280 bores/plunges (depending on the mode of operation) into the workpiece and typically generates dust and debris as represented graphically by the dust and debris D (not to scale).

The dust shroud assembly 100 is prepared for use with the power tool 270 according to the following. First, the operator determines if the mounting adapter 240 should be used. This is done by comparing the diameter of the neck 278 to the diameter of the upper end portion 120. If the diameter of the neck 278 is smaller than the diameter of the upper end portion 120, then typically the mounting adapter 240 should be used to fill the gap (as in FIG. 6). As shown in FIG. 7, the diameters of the neck 278 and the upper end portion 120 are substantially equal; as a result, the adapter is not used.

Next, the dust shroud assembly 100 is connected to the power tool 270 by first inserting the chuck 272, the neck 278, and the chisel 280 into the upper end portion 120. Thereafter, the clamp member 156 (FIG. 1) is tightened to clamp the upper end portion 120 to the connection portion 276. As the clamp member 156 is tightened, the first part 166 moves toward the second part 170 until the upper end portion 120 securely engages the neck 278 of the power tool 270. The flexibility and resiliency of the upper end portion 120 enables the shroud portion 104 to connect various power tools having a neck within a particular circumference range.

After the dust shroud assembly 100 is connected to the power tool 270, the position of the barrel 108 is adjusted to the length of the chisel 280. Typically, to prepare for drilling with a bit (represented by the chisel 280 of FIG. 7), the barrel 108 is rotated relative to the helical spring 112 so that the lower end portion 188 is aligned with a tip 284 of the chisel 280/bit. In some drilling situations, the operator adjusts the barrel 108 so that the tip 284 is positioned slightly within the bore (i.e. the lower end portion 188 is positioned below the tip 284) at the start of the drilling operation. Whereas, when preparing for chipping, typically the operator adjusts the barrel 108 so that the lower end portion 188 is positioned five to ten centimeters (5.0 to 10 cm) above the tip 284 of the chisel. In this configuration, the tip 284 should be visible to the operator of the power tool 270 to aid in positioning the chisel 280 in the appropriate place on the surface of the workpiece W.

Next, a dust collection system (not shown) is connected to the vacuum port 132. Typically, the dust collection system is connected by attaching a flexible tube (not shown) to the terminal end 176 via a friction fit between the vacuum port 132 and the flexible tube. Accordingly, in at least some embodiments a clamp member is not used to secure the flexible to the vacuum port 132. It is noted, however, that a clamp member (not shown) can be used to secure the flexible tube to the vacuum port 132, if necessary.

After the dust collection system is connected to the vacuum port 132, the dust collection system is activated and draws a vacuum through the dust shroud assembly 100 along a vacuum path, described below. The vacuum takes suction on the vacuum port 132, which draws a vacuum on the bore 168. Drawing a vacuum on the bore 168, causes a vacuum to be drawn on the bore 140. The vacuum drawn on the bore 140 draws a vacuum on the upper end portion 120 and the downward end portion 124. Additionally, the vacuum drawn on the bore 140 draws a vacuum on the bore 208 of the barrel 108. The vacuum drawn on the bore 208 causes air to enter the lower end portion 188 and exit the upper end portion 184.

With the dust collection system activated, the operator begins chiseling the workpiece W with the power tool 270. In particular, the operator positions the tip 284 in contact with the surface of the workpiece W and then activates the power tool 270, which causes the chisel 280 to chip a void 288 in the workpiece and to generate the debris D. The vacuum generated by the dust collection system draws at least a portion of the debris D into the lower end portion 188. The debris D follows the vacuum path to the dust collection system.

Typically, during a chiseling operation, the lower end portion 188 is spaced apart from the workpiece W as the operator chisels the workpiece. The lower end portion 188 is, however, maintained close enough to the workpiece W for the vacuum of the dust collection system to draw the debris D into the dust shroud assembly 100.

To use the power tool 270 for a drilling operation, the operator moves the barrel 108 to the retracted position. Then the user positions the tip 284 on the desired drilling location. Next, the operator releases the barrel 108 to cause the helical spring 112 to bias the barrel toward the relaxed position.

During the drilling operation, the helical spring 112 maintains the lower end portion 188 seated against the surface of the workpiece W as the chisel bores into the workpiece. In particular, when the power tool 270 is used to bore the workpiece W, the power tool moves in a direction substantially parallel to the longitudinal axis 136. The lower end portion 188 remains in contact with the workpiece W during this movement for a range of motion substantially equal to the compression distance 238 of the helical spring 112.

With the lower end portion 188 seated against or in contact with the workpiece W, the debris D (which is mostly dust in a typical drilling operation) generated by the chisel 280 is drawn through the barrel 108 by the vacuum of the dust collection system. The lower end portion 188 forms at least a partial seal around the upper side of the bore/void 288 to prevent the debris D from escaping to atmosphere and from contacting dust sensitive portions of the power tool 270. In particular, the debris D generated by the bit/chisel 280 is drawn into the bore 208 of the barrel 108 and follows the vacuum path described above. When the debris D exits the vacuum port 132 it is collected and contained by the dust collection system.

Figure 8:
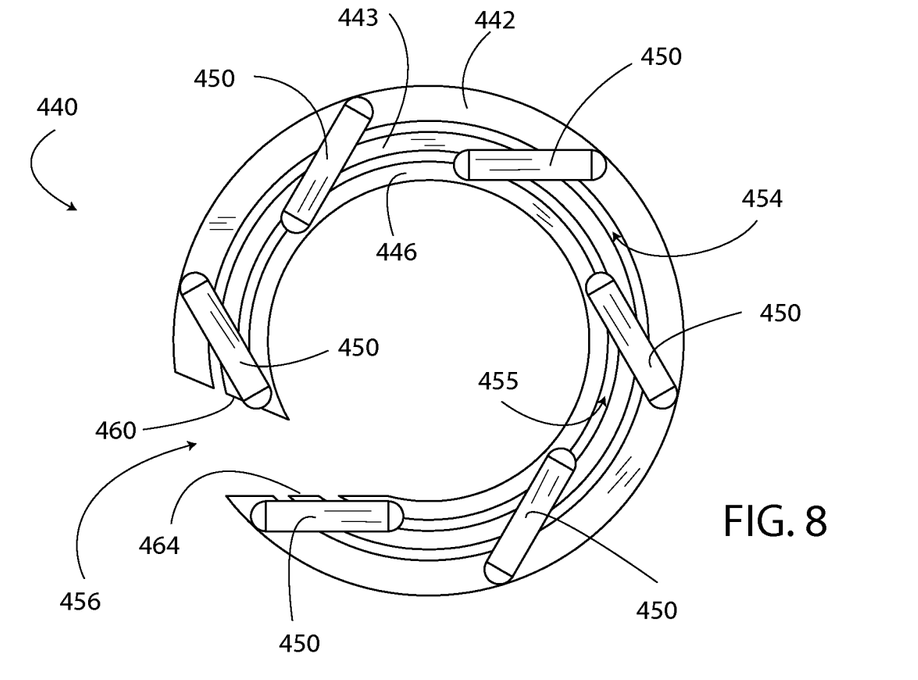
FIG. 8 is a top plan view of another embodiment of a mounting adapter for use with the dust shroud assembly of FIG. 1.
Figure 9:
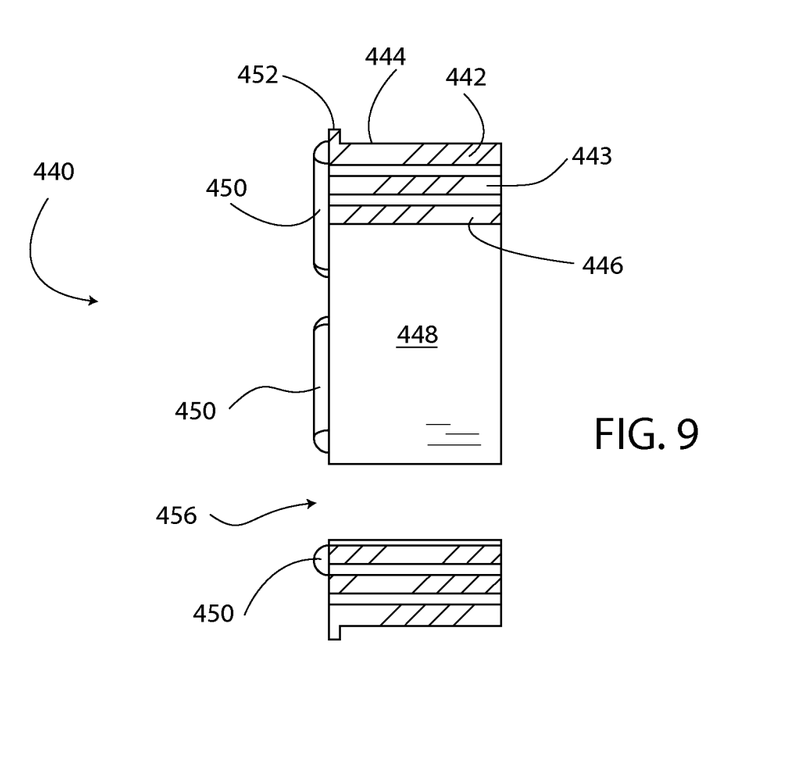
FIG. 9 is a side cross sectional view of the mounting adapter of FIG. 8.

As shown in FIGS. 8 and 9, another embodiment of the mounting adapter 440 is provided. The mounting adapter 440 includes an outer cylinder 442, a concentric middle cylinder 443, and a concentric inner cylinder 446. The outer cylinder 442 is spaced apart from the middle cylinder 443 by a bore 454. The middle cylinder 443 is spaced apart from the inner cylinder 446 by a bore 455.

Six flexible support members 450 extend from the outer cylinder 442, the middle cylinder 443, and the inner cylinder 446. The support members 450 position the outer cylinder 242, the middle cylinder 443, and the inner cylinder 446 with respect to each other. The mounting adapter 240 is substantially cylindrical and is formed from injection molded thermoplastic, such that the mounting adapter is flexible and resilient. Accordingly, at least a portion of the outer cylinder 242, the middle cylinder 443, and the inner cylinder 446 is movable with respect to the inner cylinder 246.

The outer cylinder 442 defines a first connection portion 444 and a ridge 452. The first connection portion 444 is defined by an exterior surface of the outer cylinder and is positioned against shroud portion 104 from within the bore 140 when the mounting adapter 440 is inserted into the upper end portion 120.

The ridge 452 extends outwardly from the exterior surface of the outer cylinder 442. When the mounting adapter 440 is inserted into the upper end portion 120, the ridge 452 is positioned against the shroud portion 104 to prevent further insertion of the mounting adapter 440 into the bore 140.

The inner cylinder 446 defines a second connection portion 448. The second connection portion 448 is positioned against the neck 266 when the dust shroud assembly 100 is connected to the power tool 268. The connection portion 448 is shown as having a substantially uniform profile to engage the substantially uniform neck 266; however, the connection portion 448 may have a profile of any shape as is appropriate to engage the particular neck to which the dust shroud assembly 100 is connected.

A gap 456 separates a first end portion 460 of the mounting adapter 440 from a second end portion 464 of the mounting adapter. The gap 456 enables movement of the first end portion 460 relative to the second end portion 464. This movement enables the mounting adapter 440 to conform to the neck 266 of the power tool 268.

One or more of the inner cylinder 446 and the middle cylinder 443 is separable from the outer cylinder 442 to adjust the size (typically diameter) of the mounting adapter 440, such that the mounting adapter is configured to function with a particular power tool. For example, the inner cylinder 446 can be removed from the mounting adapter 440 so that the mounting adapter includes only the outer cylinder 442 and the middle cylinder 443. In another example, both the inner cylinder 446 and the middle cylinder 443 are removed from the mounting adapter 440 so that the mounting adapter includes only the outer cylinder 442. The inner cylinder 446 and the middle cylinder 443 are removed from the mounting adapter 440 by cutting the support members 450 at a location that is aligned with the one of the bores 454, 455.

The mounting adapter 440 is usable with the shroud portion 104 of FIG. 1, a shroud portion 500 of FIG. 10 (described below), and a shroud portion 600 of FIG. 12 (described below). Additionally, it is noted that the mounting adapter 240 of FIGS. 3 to 5 is useable with the shroud portion 104 of FIG. 1, the shroud portion 500 of FIG. 10, and the shroud portion 600 of FIG. 12.

The dust shroud assembly 100 is provided in some embodiments as a kit, which includes more than one (1) of the mounting adapters. For example, the kit may include the dust shroud assembly 100, the mounting adapter 240, and the mounting adapter 440.

Figure 10:
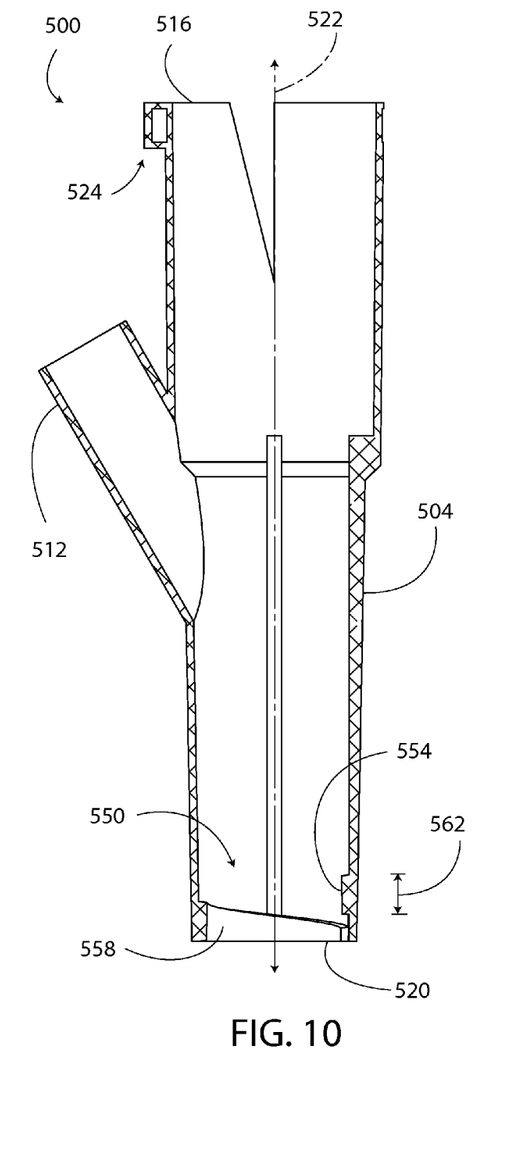
FIG. 10 is a side cross sectional view of a shroud portion of another embodiment of the dust shroud assembly of FIG. 1.
Figure 11:
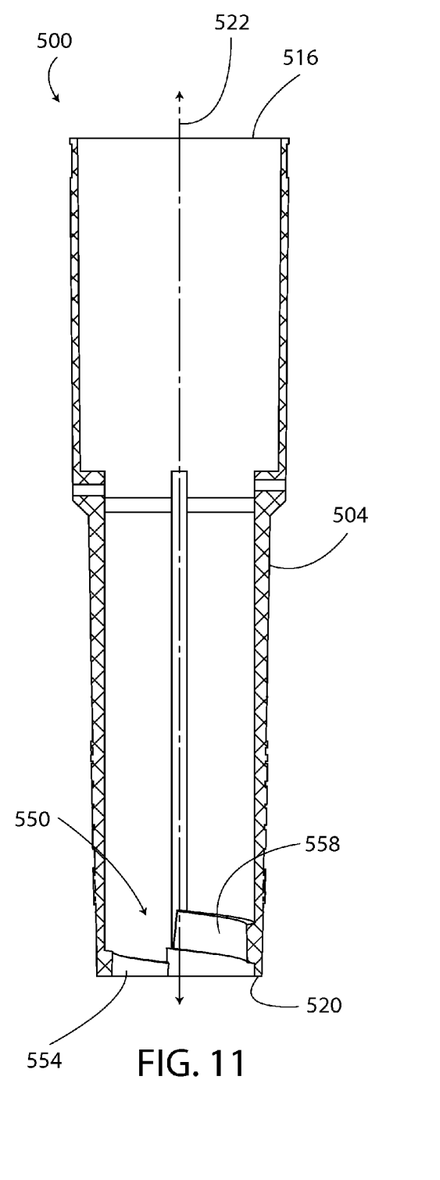
FIG. 11 is another side cross sectional view of the shroud portion of FIG. 10.

As shown in FIGS. 10 and 11, another embodiment of the dust shroud assembly includes a shroud portion 500. Although not illustrated in FIGS. 10 and 11, the dust shroud assembly also includes the barrel 108, but does not include the helical spring 112. The shroud portion 500 includes a body 504 and a vacuum port 512. The body 504 defines a substantially cylindrical upper end portion 516 and a substantially cylindrical downward end portion 520. A longitudinal axis 522 extends from the upper end portion 516 to the downward end portion 520.

The upper end portion 516 defines a connection structure 524 that is used to connect the shroud portion 500 to a neck 266, 278 of a power tool 268, 270.

The shroud portion 500 defines a barrel engaging structure 550, which fixedly extends from the body 504 toward the longitudinal axis 522. The structure 550 includes a first helical support 554 and a second helical support 558. The supports 554, 558 have an axial length 562 that is substantially equal to the pitch 224.

The supports 554, 558 rotatably engage the helical channel 222 in a manner similar to the manner in which the helical spring 112 engages the helical channel 222. Accordingly, the barrel 108 may be extended and retracted from the downward end portion 520 by rotating the barrel relative to the shroud portion 500 (i.e. the first mode of movement of the barrel 108, described above). Since the structure 550 is fixed to the body 504, the barrel 108 remains a fixed distance from the downward end portion 520 in response to a force exerted on the lower end portion 188 and directed toward the upper end portion 184.

Figure 12:
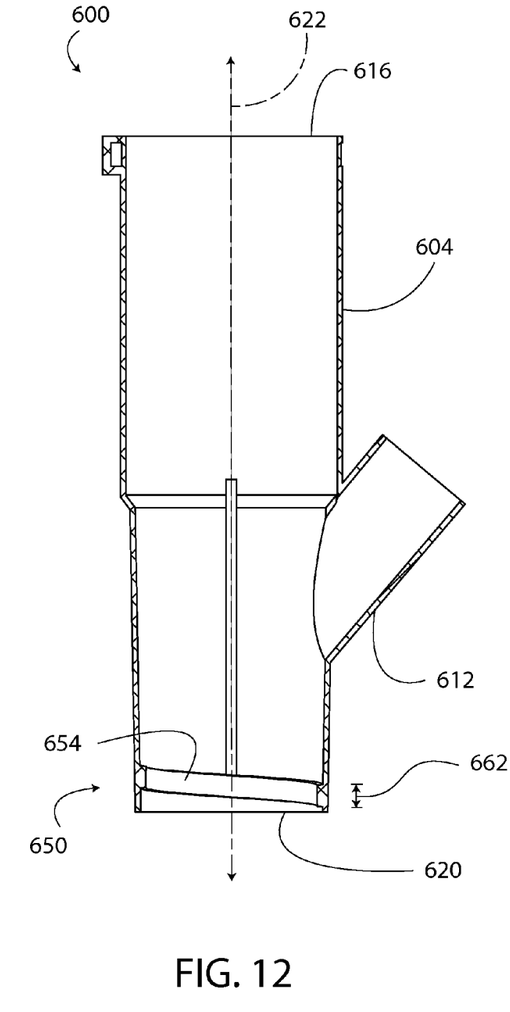
FIG. 12 is a side cross sectional view of a shroud portion of yet another embodiment of the dust shroud assembly of FIG. 1.
Figure 13:
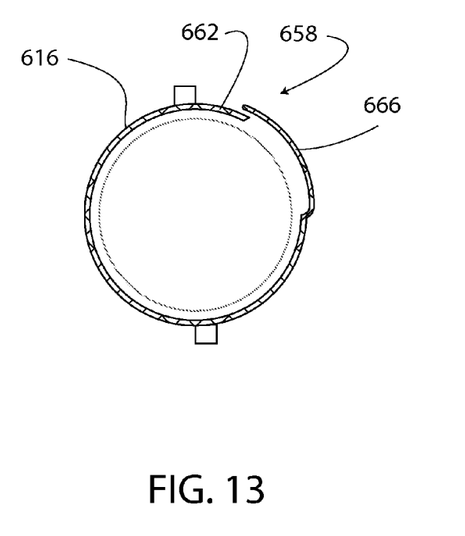
FIG. 13 is a top plan view of a portion of the shroud portion of FIG. 12.

As shown in FIGS. 12 and 13, another embodiment of the dust shroud assembly includes a shroud portion 600. Although not illustrated in FIGS. 12 and 13, the dust shroud assembly also includes the barrel 108, but does not include the helical spring 112. The shroud portion 600 includes a body 604 and a vacuum port 612. The body 604 defines a substantially cylindrical upper end portion 616 and a substantially cylindrical downward end portion 620. A longitudinal axis 622 extends from the upper end portion 616 to the downward end portion 620.

The upper end portion 616 defines a connection structure 624 that is used to connect the shroud portion 600 to a neck 266, 278 of a power tool 268, 270.

The shroud portion 600 defines a barrel engaging structure 650, which fixedly extends from the body 604 toward the longitudinal axis 622. The structure 650 includes a helical support 654. The support 654 has an axial length 622 that is approximately equal to the pitch 224.

The support 654 rotatably engages the helical channel 222 in a manner similar to the manner in which the barrel engaging structure 550 engages the helical channel 222.

As shown in FIG. 13, the upper end portion 616 defines a connection structure 658 that includes an under portion 662 and an over portion 666. The over portion 666 overlaps the under portion 662 and is configured to move relative to the under portion. In particular, movement of the over portion 666 relative to the under portion 662 determines the diameter of the upper end portion 616 to enable the upper end portion 616 to adjust to the size of the neck 226, 278 to which connection of the shroud portion 600 is desired.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A dust shroud assembly for a power tool, comprising:
   a shroud portion;
   a barrel including an upper portion slidably received within a first end portion of the shroud portion, the barrel defining a helical channel; and
   a helical spring at least partially rotatably engaged with the helical channel and rotationally fixed with respect to the shroud portion, the helical spring configured to bias the barrel outwardly from the first end portion.

2. The dust shroud assembly of claim 1, wherein:
   the helical channel is defined on an outer surface portion of the barrel.

3. The dust shroud assembly of claim 1, further comprising:
   a first mounting adapter including a first connection portion configured for connection to a second end portion of the shroud portion and a second connection portion configured for connection to a first power tool.

4. The dust shroud assembly of claim 3, further comprising:
   a second mounting adapter including a third connection portion configured for connection to the second end portion and a fourth connection portion configured for connection to a second power tool.

5. The dust shroud assembly of claim 1, wherein the barrel is substantially completely receivable within the shroud portion.

6. The dust shroud assembly of claim 1, wherein the first end portion is substantially cylindrical.

7. The dust shroud assembly of claim 1, wherein:
   the first end portion is rigid; and
   the barrel is rigid.

8. The dust shroud assembly of claim 1, the shroud portion further comprising:

a vacuum port.

9. A dust shroud assembly for a power tool, comprising:
a shroud portion including an upper end portion and a downward end portion;
a barrel axially movable with respect to the shroud portion and defining a helical channel; and
a helical spring at least partially rotatably engaged with the helical channel and rotationally fixed with respect to the shroud portion, the helical spring configured to downwardly bias the barrel.

10. The dust shroud assembly of claim 9, wherein at least a portion of the barrel is slidably received within the downward end portion.

11. The dust shroud assembly of claim 10, wherein:
the helical channel is defined on an outer surface portion of the barrel.

12. The dust shroud assembly of claim 9, further comprising:
a first mounting adapter including a first connection portion configured for connection to the upper end portion and a second connection portion configured for connection to a first power tool.

13. The dust shroud assembly of claim 12, further comprising:
a second mounting adapter including a third connection portion configured for connection to the upper end portion and a fourth connection portion configured for connection to a second power tool.

14. The dust shroud assembly of claim 9, wherein the barrel is substantially completely receivable within the shroud portion.

15. The dust shroud assembly of claim 9, wherein the downward end portion is substantially cylindrical.

16. The dust shroud assembly of claim 9, wherein:
the downward end portion is rigid; and
the barrel is rigid.

17. The dust shroud assembly of claim 9, the shroud portion further comprising:
a vacuum port.

* * * * *